United States Patent [19]

Holmgren

[11] Patent Number: 5,192,725

[45] Date of Patent: Mar. 9, 1993

[54] GALLIUM/GERMANIUM DIOCTAHEDRAL SMECTITE CLAY AND PROCESS FOR PREPARING THE CLAY

[75] Inventor: Jennifer S. Holmgren, Bloomingdale, Ill.

[73] Assignee: UOP, Des Plaines, Ill.

[21] Appl. No.: 753,511

[22] Filed: Sep. 3, 1991

[51] Int. Cl.$^5$ .................... B01J 20/06; B01J 21/16
[52] U.S. Cl. ................... 502/61; 502/62; 502/63; 502/84; 502/73
[58] Field of Search .............. 502/80, 84, 63, 73, 502/61, 62; 423/327, 328 T, 328 M

[56] References Cited

U.S. PATENT DOCUMENTS

| | | | |
|---|---|---|---|
| 3,855,147 | 12/1974 | Granquist | 423/329 |
| 3,965,043 | 6/1976 | Stridde | 252/455 R |
| 3,979,331 | 9/1976 | Stridde | 252/441 |
| 4,176,090 | 11/1979 | Vaughan et al. | 252/455 Z |
| 4,208,305 | 6/1980 | Kouwenhoven et al. | 423/328 M |
| 4,216,188 | 8/1980 | Shabrai et al. | 423/118 |
| 4,367,163 | 1/1983 | Pinnavaia et al. | 252/455 R |

FOREIGN PATENT DOCUMENTS 2164636  3/1986  United Kingdom ........... 423/328

OTHER PUBLICATIONS

R. M. Barrer & L. W. R. Dicks in J. Chem. Soc. (A), 1966, 1379–1385.
Crystal Structures of Minerals and Their X-ray Diffraction, G. W. Brindley & G. Brown, Eds., Mineralogical Society, London, 1980.
Tsuitida & Kobayashi, *J. Chem. Soc. Japan* (Pure Chem Sect.) 64, 1268 (1943).
Inoue, Osugi & Kanaji, *J. Chem. Soc. Japan* (Ind. Chem. Sec.), 61, 407 (1958).
Clays and Clay Minerals, 27, 119 (1979).

*Primary Examiner*—Carl F. Dees
*Attorney, Agent, or Firm*—Thomas K. McBride; Eugene I. Snyder; Frank S. Molinaro

[57] ABSTRACT

This invention relates to a novel dioctahedral smectite layered clay, a process for preparing the clay and a process using the clay. The clay is characterized in that the aluminum can be substituted by gallium and the silicon can be substituted by germanium. Therefore, some of the possible clays that can be prepared are gallium/silicon, gallium/germanium, or aluminum/germanium smectite clays. The clay is prepared from a reaction mixture containing reactive sources of the metals, i.e., aluminum, silicon, gallium and germanium, a templating agent and water. This reaction mixture is reacted at a pH of about 8.5 to about 14, a temperature of about 150° to about 210° C. for a time of about 1 to about 20 days to give a desired composition. The clay compositions of the instant invention can be used to catalyze various hydrocarbon conversion processes such as alkylation and hydrocracking.

19 Claims, No Drawings

GALLIUM/GERMANIUM DIOCTAHEDRAL SMECTITE CLAY AND PROCESS FOR PREPARING THE CLAY

FIELD OF THE INVENTION

This invention relates to a novel dioctahedral smectite layered clay composition, a process for preparing the clay and a process using the clay. The clay is characterized in that the aluminum can be substituted by gallium and the silicon can be substituted by germanium. The clay is prepared from a reaction mixture containing reactive sources of the metals, a templating agent and water. These clays can catalyze reactions such as alkylation, cracking, hydrocracking, etc.

BACKGROUND OF THE INVENTION

Naturally occurring clays such as dioctahedral smectites are composed of semicrystalline aluminosilicate layers (lamellae) held together by Van der Waals and electrostatic forces. Anionic charges on the siliceous layers are neutralized by cations in the interlamellar spaces. These cations are usually sodium, calcium, or potassium. When these cations are large oligomers of inorganic cations such as $Fe^{+3}$, $Cr^{+3}$ or when they are metal hydroxy polymer cations such as $[Al_{13}O_4(OH)_{24}(H_2O)_{12}]^{7+}$ or $[Zr(OH)_2 \cdot 4H_2O]_4^{8+}$, they act as pillars, propping the clay layers apart to afford a pillared layered clay. Upon heating, these oligomers or polymers are converted to the metal oxide, thus preventing the collapse of the clay layers and pillaring the clay.

These smectite clays are known to catalyze reactions such as alkylation, cracking, ester formation, dimerization, oligomerization, etc. However, because the naturally occurring clays have a large variation in impurity content, industrial demand for the natural smectites has been very limited. Therefore, attempts have been made to synthesize some of these smectite clays. For example, European Patent Application 163560 discloses a method of preparing a beidellite clay (one of the smectite clays). The process involves taking a mixture containing aluminum nitrate, tetraethylorthosilicate (TEOS), sodium carbonate and sodium hydroxide, drying the mixture and then calcining to give aluminum oxide, silicon oxide, and sodium oxide, adding to that hydroxide anions and heating the resultant slurry to a temperature of about 340° C. for 14 days.

The prior art also shows that synthetic micas can be prepared where the gallium is substituted for aluminum and germanium is substituted for silicon. For example, R. M. Barrer and L. W. R. Dicks in *J. Chem. Soc.*(A) (1966), 1379–1385, have reported the synthesis of micas in which the potassium counter ion is substituted by an ammonium counter ion, gallium is substituted for aluminum and germanium is substituted for silicon. Micas differ from dioctahedral smectite layered clays in that micas are not swellable due to the very high layer charge. Normally the mica charge is greater than 2 per formula unit while the charge on smectites varies from 0.4 to 1.6 per formula unit. The high charge found on micas leads to different chemistry than that for smectite clays.

Applicant has prepared a dioctahedral smectite clay in which the aluminum has been substituted by gallium and/or the silicon has been substituted by germanium.

The clay composition is represented by the empirical formula where A is a templating agent, M is aluminum or gallium, M' is silicon or germanium, except that when M is aluminum, M' is not silicon and x is the moles of A and varies from about 0.1 to about 2.0.

These novel smectite clays can be produced by first forming a reaction mixture which contains reactive sources of the desired metals, a templating agent and water, and then reacting the reaction mixture at a pH of about 8.5 to about 14, a temperature of about 150 to about 210° C. for a time of about 1 to about 20 days.

SUMMARY OF THE INVENTION

This invention relates to a clay composition, a process for preparing the composition and processes for using the composition. Accordingly, one embodiment of the invention is a dioctahedral smectite clay composition having the empirical formula

where A is a templating agent, M is aluminum or gallium, M' is silicon or germanium, except that when M is aluminum, M' is not silicon and x is the moles of A and varies from about 0.1 to about 2.0.

Another embodiment of the invention is a process for preparing a dioctahedral smectite clay composition having the empirical formula $A_x[M_4](M'_{8-x}M_x)(O_{20}(OH)_4$ where A is a templating agent, M is aluminum or gallium, M' is silicon or germanium, except that when M is aluminum, M' is not silicon and x is the moles of A and varies from about 0.1 to about 2.0, the process comprising providing a reaction mixture at reaction conditions and for an effective time to produce the composition, the reaction mixture comprised of reactive sources of M and M', a templating agent and water, the reaction mixture expressed in terms of molar ratios by the formula.

where R is at least one templating agent, c is the moles of R and is chosen such that the molar ratio of c/y varies from about 1 to about 20, y is the moles of $M'O_2$ and varies from about 6.6 to about 7.8, z is the moles of $M_2O_3$ and varies from about 2.1 to about 2.7 and b is the moles of water and varies from about 40 to about 500.

Yet another embodiment of the invention is a hydrocarbon conversion process comprising contacting a hydrocarbon feed under hydrocarbon conversion conditions with a catalyst to give a hydroconverted product, the catalyst comprising a dioctahedral smectite layered clay composition having the empirical formula

where A is a templating agent, M is aluminum or gallium, M' is silicon or germanium, except that when M is aluminum, M' is not silicon and x is the moles of A and varies from about 1 to about 2.0.

Other objects and embodiments will become more apparent after a more detailed description of the invention.

DETAILED DESCRIPTION OF THE INVENTION

As stated, this invention relates to a clay composition, a process for preparing the clay composition, and a process for using the composition. The composition of the instant invention is prepared from a reaction mixture which contains reactive sources of the desired metals which are selected from the group consisting of aluminum, silicon, gallium and germanium, a templating agent and water. The reaction mixture is expressed in terms of molar ratios by the formula $cR:yM'O_2:zM_2O_3:bH_2O$ where R is at least one templating agent, M is aluminum or gallium, M' is silicon or germanium, except that when M is aluminum M' is not silicon, c is the moles of R and is chosen such that the molar ratio of c/y varies from about 1 to about 20, y is the moles of $M'O_2$ and varies from about 6.6 to about 7.8, z is the moles of $M_2O_3$ and varies from about 2.1 to about 2.7 and b is the moles of water and varies from about 40 to about 500.

The templating agent which can be used in preparing the clay composition of this invention may be selected from the group consisting of alkali metal salts, secondary amines, tertiary amines, quaternary ammonium salts, quaternay phosphonium salts and mixtures thereof. Illustrative of the alkali salts which can be used are sodium hydroxide, lithium hydroxide, potassium hydroxide, and cesium hydroxide. The quaternary ammonium or quaternary phosphonium salts which can be used in this invention are those that are described by the formula $R_4M^+X^-$ where R is an alkyl group containing from 1 to 8 carbon atoms or an aryl group, M is nitrogen or phosphorus and X is hydroxyl, carbonate or halide. The quaternary ammonium compounds are preferred and especially preferred are the quaternary ammonium hydroxides. Illustrative of the quaternary compounds which can be used in the practice of the invention are the hydroxide, chloride, iodide, bromide and carbonate salts of the following cations: tetramethylammonium; tetraethylammonium; tetrapropylammonium; tetrabutylammonium; tetra-t-butylammonium; tetrapentylammonium; tetraphenylammonium; tetramethylphosphonium; tetraethylphosphonium; tetrapropylphosphonium and tetraphenylphosphonium. Illustrative of the secondary and tertiary amines which can be used are di-n-propylamine, ethylbutylamine, tripropylamine, triethylamine, piperidine, 2-methylpyridine, di-n-pentylamine, choline and N',N-dimethylbenzylamine. It should be pointed out that mixtures of the templating agents can also be used to prepare compositions of this invention. The amount of the templating agent that is necessary to prepare the composition of the present invention is determined by the amount of silicon or germanium present in the reaction mixture. It is necessary that the ratio of the moles of templating agent to the moles of silicon or germanium in the mixture vary from about 1 to about 20 and preferably from about 5 to about 10.

When aluminum is one of the desired metals, the reaction mixture contains a reactive source of aluminum. By reactive is meant a compound that is not fully condensed. That is, the compound still contains one or more hydroxide groups or is hydrated. Illustrative examples of reactive sources of aluminum include boehmite alumina, gibbsite alumina, aluminum hydroxide, aluminum alkoxides and mixtures thereof. If aluminum hydroxide is used, it is preferred to use freshly prepared aluminum hydroxide. Specific examples of aluminum alkoxides include aluminum isopropoxide and aluminum t-butoxide. When silicon is one of the desired metals, the reactive mixture contains a reactive source of silicon. Illustrative of the reactive sources of silicon are colloidal silica, silicon alkoxide and mixtures thereof. Specific examples of silicon alkoxides include tetraethylorthosilicate (TEOS) and tetramethylorthosilicate.

Examples of reactive sources of gallium include hydroxide, gallium chloride or gallium nitrate. Gallium hydroxide $[Ga(OH)_3]$ is preferred and it is preferred that the hydroxide be freshly precipitated, for example, by the reaction of $Ga_2(SO_4)_3$ with $NH_4OH$ to give the gallium hydroxide. Finally, the reactive sources of germanium include germanium tetrachloride and germanium ethoxide.

Having formed the reaction mixture, it is reacted at reaction conditions for an effective time to provide the desired composition. The reaction conditions necessary to produce the desired dioctahedral smectite layered clays include a basic pH, i.e., greater than pH 7 and preferably from about 8.5 to about 14. A basic pH is necessary to transport or mineralize the $SiO_2$ and to solubilize the reactants. The pH of the mixture is controlled by adding ammonium hydroxide to the mixture or adding more templating agent. In addition to a basic pH, it is also necessary to carry out the reaction at an elevated temperature from about 150° to about 210° C. and preferably from about 175° to about 200° C. Finally the reaction mixture is reacted under the above described reaction conditions at an effective time which ranges from about 1 to about 20 days in order to produce the desired dioctahedral smectite clay.

As stated, the dioctahedral smectite clay which is obtained by the abovedescribed procedure has the empirical formula $$A_x[M_4](M'_{8-x}M_x)(O_{20})(OH)_4$$

as defined above.

When M is gallium and M' is silicon, the clay has the X-ray diffraction pattern set forth in Table 1. This pattern was obtained using standard X-ray powder diffraction techniques. What is presented in Table 1 are interplanar spacings (d) in Angstroms, $2\theta$ and relative intensities. The d-spacings are obtained from the position of the diffraction peaks expressed as $2\theta$ where $\theta$ is the Bragg angle.

As will be understood by those skilled in the art the determination of the parameter $2\theta$ is subject to both human and mechanical error, which in combination can impose an uncertainty of about ±0.4° on each reported value of $2\theta$. This uncertainty is, of course, also manifested in the reported values of the d-spacings, which are calculated from the $2\theta$ values. This imprecision is general throughout the art and is not sufficient to preclude the differentiation of the present composition from the compositions of the prior art.

In Table 1 the relative intensities of the peaks are indicated by the notations vs, s, m and w which represent very strong, strong, medium and weak, respectively. The intensities are relative to the strongest peak and are calculated by the ratio $I/I_o$ where $I_o$ is the intensity of the strongest peak and I is the intensity of the other peaks. The intensities are determined from the heights of the diffraction peaks after subtracting out the background. In terms of $100 \times I/I_o$, the above notations are defined as follows:

vs=80–100, s=60–80, m=15–60, w=0–15.

TABLE 1

| 2θ | d(Å) | 100 × I/I₀ |
|---|---|---|
| 6.48 | 13.62 | vs |
| 19.60 | 4.52 | m |
| 20.60 | 4.31 | w |
| 21.26 | 4.17 | w |
| 22.39 | 3.97 | w |
| 23.50 | 3.78 | w |
| 26.08 | 3.41 | w |
| 27.56 | 3.23 | w |
| 29.20 | 3.06 | w |
| 31.24 | 2.86 | w |
| 32.73 | 2.73 | w |
| 34.39 | 2.60 | w |
| 35.82 | 2.50 | w |
| 38.42 | 2.34 | w |
| 39.65 | 2.27 | w |
| 40.71 | 2.21 | w |
| 41.94 | 2.15 | w |
| 44.76 | 2.02 | w |
| 46.48 | 1.95 | w |
| 51.37 | 1.78 | w |
| 53.24 | 1.72 | w |
| 54.81 | 1.67 | w |
| 56.97 | 1.61 | w |
| 60.98 | 1.52 | w |

Two classifications of clays are di- and trioctahedral clays. In general, di-and trioctahedral clays can be characterized by the value of their b-parameter. The b-parameter, which is related to the repeat unit length in the octahedral layer, can be determined from the position of the 060 reflection. For dioctahedral minerals this reflection has spacings between 1.48–1.50 Angstroms whereas for trioctahedral minerals it is between 1.53–1.55 Angstroms. See Crystal Structures of Minerals and their X-ray Diffraction, G. W. Brindley and G. Brown, Eds., Mineralogical Society, London, 1980. When M is gallium and M' is silicon, the clay is found to have its 060 reflection at a d-spacing of 1.52 Angstroms instead of 1.49–1.50 indicating that the larger Ga cation has replaced Al in the octahedral layer.

The smectite clay composition of this invention can be used as is or it can be pillared to catalyze various hydrocarbon processes. It is preferred to catalyze the various hydrocarbon process with a pillared smectite clay. The clay can be pillared using methods well known in the art. Examples of pillars which are well known in the art are alumina, rare earth containing alumina, $ZrO_2$, $TiO_2$, $Cr_2O_3$, $SiO_2$ and Si/Al (silica/alumina). As stated, these pillars are introduced by combining the clay with an oligomer or polymer of the desired cation or mixture of cations at reaction conditions. For example, alumina pillars may be introduced by using aluminum chlorohydrate. Aluminum chlorohydrate (also known as aluminum chlorohydroxide) is a polymeric metal complex having the empirical formula

$$Al_{2+n}(OH)_{2n}Cl_6$$

where n has a value of about 4 to 12. The preparation of this aluminum polymer is generally known to those skilled in the art. See, for example: Tsuitida and Kobayashi, J. Chem. Soc. Japan (Pure Chem. Sect.), 64, 1268 (1943). Inoue, Osugi and Kanaji, J. Chem. Soc. Japan (Ind. Chem. Sec.), 61, 407 (1958).

A rare earth ACH is an ACH as described above which is modified to include one or more rare earth elements such as cerium, lanthanum, neodymium, europium, etc. The ACH polymer is modified with the rare earth by adding a soluble rare earth salt, preferably a water soluble rare earth salt. Examples of rare earth salts are the nitrates, halides, sulfates and acetates. Preferred rare earth elements are cerium and lanthanum with cerium nitrate and lanthanum nitrate being the preferred salts. The rare earth is introduced into the polymer or oligomer structure by mixing the rare earth salt either in solution (water preferred) or as a solid with the ACH. The resulting solution is refluxed at a temperature of about 105° to about 145° C. for a time of about 24 to about 100 hours. The weight ratio of rare earth (expressed as oxide, e.g., $CeO_2$) to alumina ($Al_2O_3$) in the solution prior to refluxing is from about 1:52 to about 1:1.

Descriptions of the other pillaring materials can be found in the following references: 1) Si/Al—U.S. Pat. No. 4,176,090; 2) zirconia—Clays and Clay Minerals, 27, 119 (1979) and U.S. Pat. No. 4,176,090; 3) titania—U.S. Pat. No. 4,176,090; 4) chromium oxide—U.S. Pat. No. 4,216,188 and 5) silicon oxide—U.S. Pat. No. 4,367,163, all of which are incorporated by reference.

These pillared clays are prepared by means well known in the art such as adding the smectite clay to a solution containing the pillar or a pillar precursor, stirring, filtering, redispersing with water (one or more times), isolating, drying and calcining at about 300° to about 800° for a time sufficient to fix the structure (preferably about 16 hours).

As stated, smectite clay compositions are used to catalyze hydrocarbon conversion processes such as alkylation, cracking, hydrocracking, ester formation, dimerization, oligomerization, etc. It is particularly preferred to use the clay compositions of this invention whether pillared or non-pillared to catalyze alkylation and hydrocracking processes. The conditions necessary to carry out alkylation of aromatic compounds are well known and are disclosed, for example, in U.S. Pat. Nos. 3,965,043 and 3,979,331 which are incorporated by reference. Generally the process can be carried out in a batch type or a continuous type operation. In a batch type process, the catalyst, aromatic compound and alkylating agent are placed in an autoclave and the pressure increased, if necessary, in order to effect the reaction in the liquid phase. An excess amount of aromatic compound should be present, preferably in a range of about 2:1 to about 20:1 moles of aromatic compound per mole of alkylating agent. The reaction is carried out at an elevated temperature since the rate of alkylation is undesirably low at room temperature. Preferably the temperature is in the range of about 40° to about 200° C. The process is carried out for a time of about 0.5 to about 4 hours, after which the product is separated from the starting materials by conventional means.

If it is desired to carry out the process in a continuous manner, the catalyst is placed in a reactor which is heated to the desired operating temperature and the pressure increased above atmospheric, if necessary. The aromatic compound and alkylating agent are flowed over the catalyst bed at a predetermined liquid hourly space velocity sufficient to effect alkylation. The effluent is continuously withdrawn and conventional separation means used to isolate the desired product.

Hydrocracking conditions typically include a temperature in the range of 400° to 1200° F. (204°–649° C.), preferably between 600° and 950° F. (316°–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 hr$^{-1}$, preferably between about 0.2 and 3 hr$^{-1}$. Hydrogen circulation rates are in the range of 1,000 to 50,000 standard cubic feet (scf) per barrel of charge (178–8,888 std. m$^3$/m$^3$), preferably between 2,000 and 30,000 scf per barrel of charge (355–5,333 std. m$^3$/m$^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the clay composition using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

The following examples are presented in illustration of this invention and are not intended as undue limitations on the generally broad scope of the invention as set out in the appended claims.

EXAMPLE 1

Preparation of Ga(OH)$_3$

An aqueous solution of Ga$_2$(SO$_4$)$_3$ was prepared by mixing 25 g of Ga$_2$(SO$_4$)$_3$ in 200 g of water. The pH of this solution was raised to 7 by adding an aqueous solution of NH$_4$OH. As the pH of the solution was increased, a fine precipitate formed. The composition of this precipitate was Ga(OH)$_3$.xH$_2$O. The precipitate was recovered with a centrifuge and washed with water until SO$_4{}^{-2}$-free. The solid was used as a reactant without any further treatment.

EXAMPLE 2

Preparation of Ga-Smectite

Tetramethylammonium hydroxide (TMAOH) (30 g) was dissolved in 345 g of water. To this solution there was added the Ga(OH)$_3$ prepared in Example 1. The slurry was mixed until the Ga(OH)$_3$ dissolved. While stirring rapidly, 16.7 g of colloidal silica which has been ammonia stabilized (obtained from DuPont Inc. and identified as Ludox ™ AS-40) was added. The slurry was stirred until homogeneous and then aged quiescently under autogenous pressure in a Parr Reactor (125 cc) for 2 days at 200° C. The product was collected by centrifugation and washed with water until the residual TMAOH was removed. The product was then dried at 110° C. for 16 hours. XRD characterization of the product showed it to have a unique pattern which includes the peaks commonly associated with a smectite clay. The position of the (060) peak was shifted to 1.52 Angstroms. The position of the (060) peak in Al-based dioctahedral clays should be at 1.49–1.50 Angstroms. The shift to higher d-spacing supports the theory that a larger cation, Ga, has replaced the Al in the octahedral layer.

EXAMPLE 3

Preparation of Pillared Ga-smectite

A solution of 20 g of ACH solution (Reheis ™) in 500 g of water was prepared. To this solution there were added 10 g of the TMA-Ga-smectite clay prepared in Example 2. The slurry was heated to 60° C. and aged with stirring for 2 hours. After cooling to room temperature, the clay was recovered by centrifugation and washed with water until substantially chloride free. The product was dried at 60° C. for 16 hours. The sample was characterized by its X-ray diffraction pattern which showed a d$_{(001)}$-spacing of 19.2 Angstroms and by N$_2$ adsorption which showed a BET surface area of 245 m$^2$/g.

The cracking activity of this pillard clay was determined using the following heptene cracking test. The heptene cracking test uses an electrically heated reactor which is loaded with 125 mg of 40–60 mesh (420–250 microns) particles of the catalyst to be tested. The catalyst was dried in situ for 30 minutes at 200° C. using flowing hydrogen, and then subjected to a reduction treatment of 425° C. in flowing hydrogen for one hour. The temperature of the reactor was then adjusted to 425° C. (inlet). The feed stream used to test the catalyst consists of hydrogen gas which is saturated with 1-heptene at 0° C. and atmospheric pressure. The feed stream was flowed over the catalyst at a flow of 125 cc/min. The effluent gas stream was analyzed using a gas chromatograph in order to calculate weight percent cracked product. Cracked product is product that has a lower molecular weight than the starting 1-heptene hydrocarbon. This sample had a cracking activity of 18 weight percent.

I claim as my invention:

1. A dioctahedral smectite layered clay composition having the empirical formula

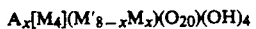

$$A_x[M_4](M'_{8-x}M_x)(O_{20})(OH)_4$$

where A is a templating agent, M is aluminum or gallium, M' is silicon or germanium, except that when M is aluminum, M' is not silicon and x is the moles of A and varies from about 0.1 to about 2.0.

2. The composition of claim 1 where A is a templating agent selected from the group consisting of alkali metals, secondary amines, tertiary amines, quaternay ammonium ions, quaternary phosphonium ions and mixtures thereof.

3. The composition of claim 2 where A is a quaternary ammonium ion selected from the group consisting of tetramethylammonium ion, tetraethylammonium ion, tetrapropylammonium ion, tetra-t-butylammonium ion, tetrapentylammonium ion, tetraphenylammonium ion, and mixtures thereof.

4. The composition of claim 2 where A is an alkali metal selected from the group consisting of lithium, sodium and potassium.

5. The composition of claim 1 where M is gallium and M' is silicon.

6. The composition of claim 5 where the composition has the crystal structure of smectite.

7. The composition of claim 1 where M is gallium and M' is germanium.

8. The composition of claim 1 where M is aluminum and M' is germanium.

9. The composition of claim 1 further characterized in that its layers are pillared by a pillar selected from the group consisting of $Al_2O_3$, rare earth containing $Al_2O_3$, $ZrO_2$, $TiO_2$, $Cr_2O_3$, $SiO_2$ and silica/alumina.

10. A process for preparing a dioctahedral smectite clay composition having the empirical formula $$A_x[M_4](M'_{8-x}M_x)(O_{20})(OH)_4$$

where A is a templating agent, M is aluminum or gallium, M' is silicon or germanium, except that when M is aluminum, M' is not silicon and x is the moles of A and varies from about 0.1 to about 2.0; the process comprising providing a reaction mixture at reaction conditions and for an effective time to produce the composition, the reaction mixture comprised of reactive sources of M and M', a templating agent and water, the reaction mixture expressed in terms of molar ratios by the formula $$cR:yM'O_2:M_2O_3:bH_2O$$

where R is at least one templating agent, c is the moles of R and is chosen such that the molar ratio of c/y varies from about 1 to about 20, y is the moles of $M'O_2$ and varies from about 6.6 to about 7.8, z is the moles of $M_2O_3$ and varies from about 2.1 to about 2.7 and b is the moles of water and varies from about 40 to about 500.

11. The process of claim 10 where the reaction conditions are a pH of about 8.5 to about 14 and a temperature of about 150° to about 210° C.

12. The process of claim 10 where the mixture is reacted for a time of about 1 to about 20 days.

13. The process of claim 10 where the templating agent R is selected from the group consisting of alkali metal salts, secondary amines, tertiary amines, quaternary ammonium salts, quaternary phosphonium salts and mixtures thereof.

14. The process of claim 13 where the templating agent is an alkali metal salt selected from the group consisting of sodium hydroxide, potassium hydroxide and lithium hydroxide.

15. The process of claim 13 where the templating agent is a quaternary ammonium salt selected from the group consisting of tetramethylammonium salts, tetraethylammonium salts, tetrapropylammonium salts, tetra-t-butylammonium salts, tetrapentylammonium salts, tetraphenylammonium salts and mixtures thereof.

16. The process of claim 10 where M is gallium and the reactive source of gallium is selected from the group consisting of gallium hydroxide, gallium chloride and gallium nitrate.

17. The process of claim 10 where M is aluminum and the reactive source of aluminum is selected from the group consisting of boehmite alumina, gibbsite alumina, aluminum hydroxide, aluminum alkoxides and mixtures thereof.

18. The process of claim 10 where M' is silicon and the reactive source of silicon is selected from the group consisting of colloidal silica, tetraethylorthosilicate, tetramethylorthosilicate and mixtures thereof.

19. The process of claim 10 where M' is germanium and the reactive source of germanium is selected from the group consisting of germanium ethoxide and germanium tetrachloride.

* * * * *